Patented June 7, 1938

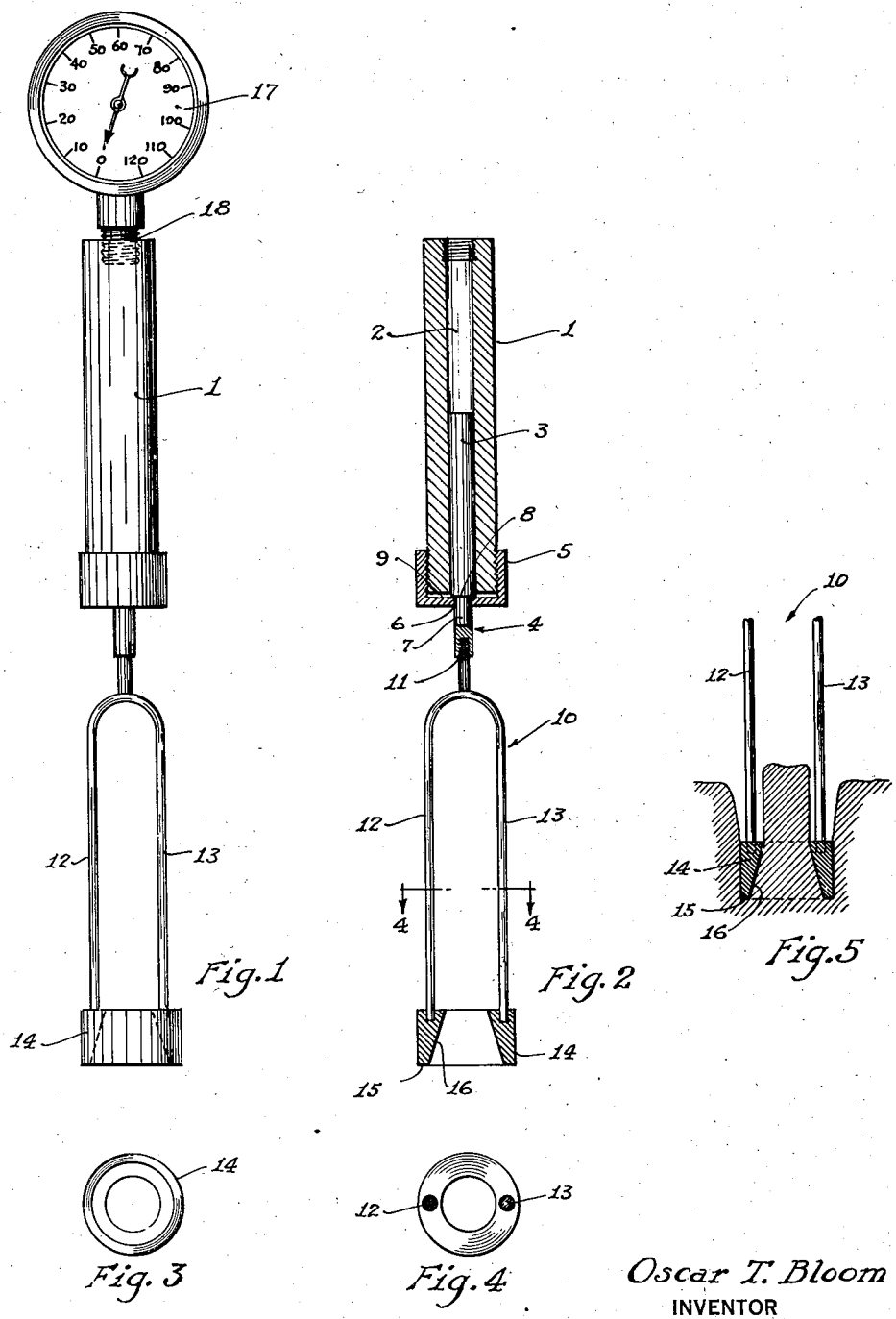

2,119,699

UNITED STATES PATENT OFFICE 2,119,699

CONSISTENCY TESTER

Oscar T. Bloom, Chicago, Ill., assignor to Industrial Patents Corporation, Chicago, Ill., a corporation of Delaware Application November 23, 1936, Serial No. 112,414

5 Claims. (Cl. 265—11)

This invention relates to an apparatus for measuring consistency.

One of the objects of the invention is to provide an apparatus for determining the consistency of shortening.

Another object of the invention is to provide an apparatus for measuring the consistency or tenderness of food products.

Other objects of the invention will be apparent from the description and claims which follow.

A preferred embodiment of the invention is depicted in the accompanying drawing in which similar reference characters in the several figures indicate similar parts.

Figure 1 is a side view of the apparatus.

Figure 2 is a view partly in section showing the piston and cylinder.

Figure 3 is an end view of Figure 1.

Figure 4 is a view taken on the line 4—4 of Figure 2.

Figure 5 is a view partly in section showing the operation of the working head.

The apparatus consists essentially of a metal cylinder 1 having a smooth bore 2, in which operates piston 3 of plunger 4. Collar 5 is threaded to one end of cylinder 1 and is provided with aperture 6 to accommodate shank 7 of plunger 4. Shoulder 8 is adapted to abut the inner surface 9 of collar 5 to restrict the outward movement of plunger 4. Wire fork 10 is threaded in shank 7 of plunger 4 at 11. Tines 12 and 13 of fork 10 are fixed to ring 14. Ring 14 is provided with edge 15 and inwardly tapered surface 16. A standard pressure gauge 17 is threaded in cylinder 1 at 18. The bore 2 is filled with a noncompressible liquid such as glycerine. In operation the edge 15 of ring 14 is pressed into the product being tested, forcing piston 3 upwardly and causing the liquid in bore 2 to actuate the gauge 17, giving a direct reading.

Assuming a metal cylinder four inches long, having a three-fourths-inch outside diameter, and a smooth bore of 0.252 inch in diameter, the piston having a cross-sectional area of one-twentieth of one square inch, working against a pressure gauge calibrated in pounds per square inch, it will be seen that a pressure of one-twentieth of a pound exerted against the special head would give a reading of one pound on the gauge. The special head or ring 14 employed with an apparatus having the foregoing measurements is preferably a hollow cylinder one inch in diameter and approximately five-eighths-inch in length long with a conical bore, the lower or cutting edge being approximately one-twenty-fifth-inch in width, and the upper or exit opening of the bore being approximately five-eighths-inch in diameter.

When the instrument is pushed into a sample of shortening compound with a steady, easy motion, the maximum pressure is reached when the compound starts coming out of the top end of the head, and does not change unless the moving compound strikes one or both of the tines 12 and 13.

It will be apparent that the apparatus of the present invention may be employed in determining the consistency or tenderness of divers materials such as fats, shortening compounds, lard, meats, and the like.

It will be understood that changes may be made in the details of construction of the apparatus of the present invention without departing from the spirit thereof, as defined in the claims which follow.

I claim:

1. In a consistency tester including a pressure measuring means, a working head operatively connected with the pressure measuring means comprising a circular ring having a conical orifice providing tapered resistance shoulders.

2. In a consistency tester including a pressure measuring means, a working head operatively connected with the pressure measuring means comprising a member having a tapered opening therethrough, the walls of said opening providing tapered resistance shoulders.

3. In a consistency tester including a pressure measuring means, a working head operatively connected with the pressure measuring means comprising a member having a conical orifice, the wall of said orifice providing an annular resistance shoulder.

4. In a consistency tester including a pressure measuring means, a working head operatively connected with the pressure measuring means comprising a circular ring having a conical orifice, the wall of said orifice providing an annular resistance shoulder.

5. In a consistency tester including a pressure measuring means, a working head comprising a member having a conical opening therethrough, the walls of said opening providing tapered resistance shoulders, and means including a forked member operatively connecting said working head with said pressure measuring means.

OSCAR T. BLOOM.